US008214746B2

(12) United States Patent
Hamilton et al.

(10) Patent No.: US 8,214,746 B2
(45) Date of Patent: Jul. 3, 2012

(54) ESTABLISHMENT OF MESSAGE CONTEXT IN A COLLABORATION SYSTEM

(75) Inventors: Mary Hamilton, Chicago, IL (US); Beata Korytkowski, Chicago, IL (US); Joshua Kahn, Chicago, IL (US); Charles Nebolsky, Northbrook, IL (US)

(73) Assignee: Accenture Global Services Limited, Dublin (IE)

( * ) Notice: Subject to any disclaimer, the term of this patent is extended or adjusted under 35 U.S.C. 154(b) by 518 days.

(21) Appl. No.: 11/686,728

(22) Filed: Mar. 15, 2007

(65) Prior Publication Data
US 2008/0229213 A1    Sep. 18, 2008

(51) Int. Cl.
*G06F 3/00* (2006.01)
(52) U.S. Cl. .................. 715/751; 715/753; 715/759
(58) Field of Classification Search .............. 715/753, 715/752, 758, 751, 759
See application file for complete search history.

(56) References Cited

U.S. PATENT DOCUMENTS

| 6,339,745 | B1 * | 1/2002 | Novik .................. 701/208 |
| 7,062,505 | B2 | 6/2006 | Lane et al. |
| 7,082,458 | B1 | 7/2006 | Guadagno |
| 7,130,885 | B2 | 10/2006 | Mala et al. |
| 7,234,117 | B2 * | 6/2007 | Zaner et al. .................. 715/758 |
| 2001/0049681 | A1 | 12/2001 | Bova |
| 2002/0149604 | A1 | 10/2002 | Wilkinson |
| 2002/0184191 | A1 | 12/2002 | Marpe |
| 2003/0158960 | A1 | 8/2003 | Engberg |
| 2004/0003042 | A1 | 1/2004 | Horvitz et al. |
| 2004/0003132 | A1 | 1/2004 | Stanley et al. |
| 2004/0039779 | A1 | 2/2004 | Amstrong et al. |
| 2004/0267721 | A1 | 12/2004 | Meyerzon et al. |
| 2005/0027696 | A1 | 2/2005 | Swaminathan et al. |
| 2005/0038687 | A1 | 2/2005 | Galdes |
| 2005/0097440 | A1 | 5/2005 | Lusk et al. |
| 2005/0283802 | A1 | 12/2005 | Corl |
| 2006/0033738 | A1 | 2/2006 | Wilkinson et al. |
| 2006/0011704 | A1 | 6/2006 | Hu et al. |
| 2006/0190391 | A1 | 8/2006 | Cullen |

(Continued)

FOREIGN PATENT DOCUMENTS

WO    2004015504 A1    2/2004

(Continued)

OTHER PUBLICATIONS

European Search Report issued in EP Application 08250887 on Aug. 28, 2008.

(Continued)

*Primary Examiner* — Steven Sax
(74) *Attorney, Agent, or Firm* — Vedder Price PC

(57) ABSTRACT

A processing device used to support communications between users of the collaboration system is provided with a graphical user interface. A graphical context activation mechanism associated with a discussion between users of the collaboration system may be displayed. Responsive to a selection input, a graphical illustration of information regarding the users participating in the discussion is displayed. The graphical illustration may comprise indicia of location of at least one of the users that may be displayed, for example, within the context of a geographical map. The graphical illustration may further comprise indicia of identity of at least one of the users. Additionally, a textual context activation mechanism may be provided and utilized in the same manner, thereby allowing text-based context regarding the message to be displayed. In this manner, team-wide context may be more readily established.

12 Claims, 11 Drawing Sheets

U.S. PATENT DOCUMENTS

2007/0146824 A1 7/2007 Thompson
2008/0046510 A1 2/2008 Beauchamp et al.
2010/0106752 A1 4/2010 Eckardt et al.

FOREIGN PATENT DOCUMENTS

WO 2006076199 A1 7/2006

OTHER PUBLICATIONS

"AdsML Framework for E-Commerce Business Standards for Advertising—Structured Descriptions of Advertisement Objects 1.0.3, Part 1, Usage Rules and Guidelines", Oct. 1, 2006, AdsML Consortium.

"AdsML Guidelines for AdsML Adticket XMP Custom Panels" 1 Oct. 1, 2006, AdsML Consortium.

M. Pellegrino, "The Use of SDMX Standards for Supporting Reference Metadata Interchange within the OSDI Project", Dec. 20, 2006, Eurostat.

European Search Report issued in EP Application No. 11164679.0 on Jul. 12, 2011.

Wang, et al., "Collaborative Scheduling Using JMS in a Mixed Java and .NET Environment", Jul. 17, 2006, Jet Propulsion Laboratory, National Aeronautics and Space Administration.

* cited by examiner

ESTABLISHMENT OF MESSAGE CONTEXT IN A COLLABORATION SYSTEM

CROSS-REFERENCE TO RELATED APPLICATIONS

The present invention is related to co-pending applications having Ser. Nos. 11/686,708 and 11/686,736 filed on even date herewith.

FIELD OF THE INVENTION

The present invention relates to techniques for fostering a collaborative environment and, in particular, to a collaboration system that provides improved capture, distribution and maintenance of communications and contexts therefore.

BACKGROUND OF THE INVENTION

With the advent of more powerful communication technologies, the use of cross-border collaborative project teams has increased. For example, it is not uncommon in the software development industry to have teams of developers and management spread across the globe. While such collaborative project teams typically enjoy the benefit of being able to draw upon efficient resources, the remoteness between team members can give rise to significant challenges that may significantly undercut, or entirely overwhelm, the efficiencies gained.

For example, where the project at hand comprises complex work involving a significant need for interaction between team members, remote collaborators that are not co-located with project management often have a difficult time establishing contextual knowledge relevant to the project. For example, on a software development project, a developer in India may not fully appreciate the project requirements worked out through face-to-face meetings with the customer by U.S.-based project managers. On the other hand, a project manager may not be able to quickly appreciate the subtleties of a technological issue encountered by the development team without significantly interacting with the developers. Such inefficiencies can be compounded by the fact that different team members may have different levels of experience and knowledge, thereby making it difficult to maintain quality. Additionally, differences in time zones between team members may create substantial lags in response time when critical issues arise, and provide a limited amount of time in which multiple team members may conference together. Further still, differences in culture or language may create difficulties when trying to understand implied instructions from team management.

Prior art solutions to such collaboration difficulties tend to be ad hoc approaches using existing, disparate content repositories and communication and tracking tools. For example, project team members may attempt to use emails as the primary channel for communicating issues as they arise or to use issue tracking software to maintain historical context regarding how such issues were addressed. While such tools are individually suited for the particular tasks for which they are designed, collectively, they typically are unable to provide the necessary level of structure and support to maximize efficiency of the collaboration team. Further, existing tools that may contain workflow functionality to formalize and structure standard types of communication, e.g., issue tracking, risk management, document versioning, do not account for informal communications that are necessary to perform collaborative work. Stated another way, there currently are no systems or tools that provide coordinated operation between such separate collaboration tools. A consequence of this shortcoming is a lack of context. As used herein 'context' comprises any information that provides greater understanding of the subject matter of a given communication or deliverable artifact, such as a document or portion of code, beyond the actual content of the item, e.g., historical information concerning a specific issue, identification of specific parties having an interest in the specific subject matter, classification of the subject matter, etc. Such context in communications between team members typically ensures more meaningful communications, e.g., the difference between awareness of the content of a communication and a true understanding of the implications of such content. Therefore, a collaboration system or suite of tools that overcome these problems would represent an advancement in the art.

SUMMARY OF THE INVENTION

The present invention overcomes the limitations of the prior art described above through the use of an integrated collaboration system. The collaboration system in accordance with the present invention draws upon three guiding principles in its structure and operation. First, it is necessary to organize communication channels between collaboration team members. Second, it is necessary to build context around communications between team members. Third, wherever possible, relationships between collaborators should be enhanced. To this end, the collaboration system of the present invention provides various components that allow currently-used communication channels, e.g., electronic mail, instant messaging, etc., and content formats, e.g., text, audio, images, video, etc., to be organized such that contextual information surrounding messages sent within the system is more readily captured and used to organize the messages.

Thus, in one aspect of the inventive collaboration system, a processing device (e.g., a user terminal) used to support communications between users of the collaboration system is provided with a graphical user interface, i.e., a display and at least one user input device. A graphical context activation mechanism associated with a discussion between users of the collaboration system may be displayed. A selection input may be received in response to selection of the graphical context activation mechanism via the at least one user input device. Responsive to the selection input, a graphical illustration of information regarding the users participating in the discussion is displayed. In a presently preferred embodiment, the graphical illustration may comprise indicia of location of at least one of the users that may be displayed, for example, within the context of a geographical map. The graphical illustration may further comprise indicia of identity of at least one of the users, for example, visual depictions of such users. Additionally, a textual context activation mechanism may be provided and utilized in the same manner, thereby allowing text-based context regarding the message to be displayed such as at least a portion of the discussion, i.e., other messages. Individual discussions, each optionally comprising an urgency indicator, may be individually selected for further display. In this manner, team-wide context and participation may be more readily established, thereby fostering better understanding between team members and, consequently, more efficient collaboration.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION OF THE PRESENT EMBODIMENTS

Figure 1:
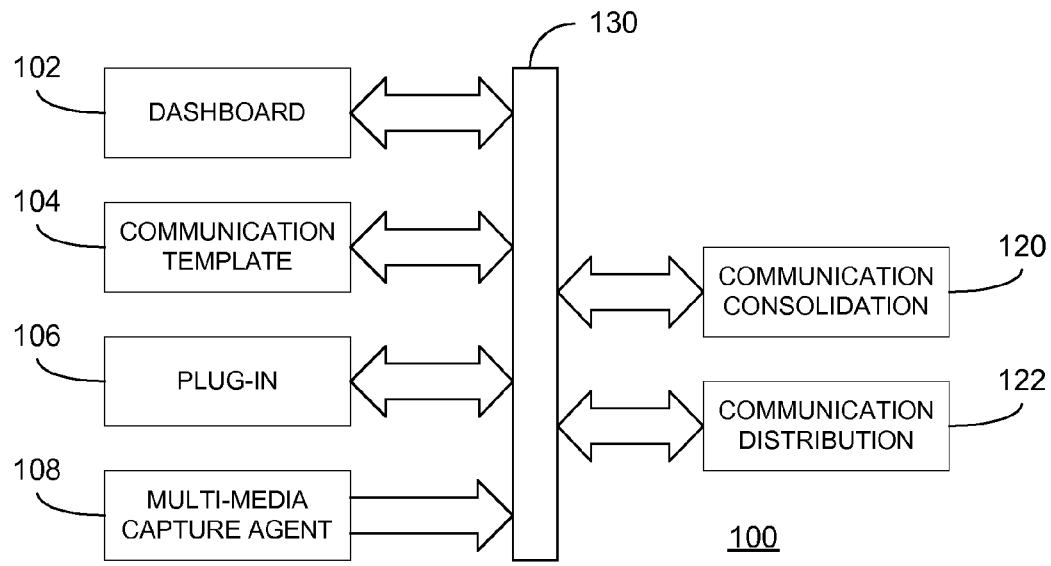
FIG. 1 is a functional illustration of a collaboration system in accordance with an embodiment of the present invention.

Referring now to FIG. 1, a collaboration system 100 in accordance with the present invention is functionally illustrated. The collaboration system 100 is essentially a communication system that is enhanced with features that provide greater support to collaborative teams than currently available. In particular, the system 100 comprises one or more user interface components 102-108 and one or more back-end components 120, 122 communicating with each other via at least one communication channel 130. In a presently preferred embodiment, each of the interface components 102-108 and each of the back-end components 120, 122 are implemented using known software programming techniques. Using such techniques, suitable processing devices (such as desktop/laptop/handheld computers, mobile communication devices such as cellular phones, personal digital assistants, one or more server computers, etc.) may operate under the control of executable instructions to carry out the various functions described herein. However, those having skill in the art will appreciate that various other techniques may be equally employed, in whole or in part, to implement the operations of the present invention including, but not limited to, application specific integrated circuits (ASICs), programmable logic arrays implementing state machines, etc.

Generally, the interface components 102-108 serve as a mechanism for a user of the system 100 to generate communications for distribution to other users of the system 100 while providing greater ability to generate, preserve and use contextual information that fosters greater understanding among collaborators. For example, the interface components may include a dashboard 102 that serves as a central portal for accessing the various features of the collaboration system. In a presently preferred embodiment, the dashboard 102 is implemented as a web-based, graphical interface, using techniques known to those having skill in the art. Using the dashboard 102, a user of the system may access, create, and manage any communications that he/she generates or receives, control a profile of the user maintained by the system, access such profiles of other collaborators and access and manage various content or media files generated/received by the user.

A communication template 104 serves as a standardized interface for the generation of one or more types of communications and corresponding metadata. Preferably, the communication template 104 is based on one or more existing, software-based communication applications, such as Microsoft's "OUTLOOK" email application. As described in greater detail below, the metadata captured in this manner is preferably based on a plurality of standardized metadata attributes that are defined in accordance with the particular needs of the collaborative project. For example, a software development team may have one set of metadata attributes that would be most useful, whereas an industrial manufacturing team may have another set of metadata attributes that would be most useful. The one or more communication types supported by the communication template 104 may be any commonly used types such as email, instant messaging, short message service (SMS), etc. To support such different services, the communication template 104 may comprise multiple templates, one for each communication type, but each still implementing the standardized metadata attributes. Techniques for implementing one or more templates of this type are well known to those having ordinary skill in the art. Such multiple templates, if used, could be provided with a common user interface or maintained as separately usable entities. Regardless, the standardized nature of the templates ensures that users are triggered to provide the most important relevant information for each type of communication.

Recognizing that the most convenient point for generating certain communications may be within particular tools used by the various collaborators, the present invention also provides for the integration of communication interfaces into such tools. In the specific case of such tools that are implemented as software programs, a plug-in component 106 may be provided. As known in the art, a so-called "plug-in" is a discrete software program implementing additional functions that may be readily integrated into an existing software program using a standardized interface. In the context, for example, of a software development project, such a plug-in implements an interface allowing a user to access and generate messages in a manner similar to the communication template 104, but within an integrated development environment program in which developers are performing software development tasks. Those having skill in the art will appreciate that implementations other than plug-in programs may be equally employed for this purpose.

Finally, the user interface components also comprise a multi-media capture agent 108 used to generate content files by users of the collaboration system 100. For example, the capture agent 108 may be implemented using Microsoft's "WINDOWS" Media Encoder application. As used herein, a content file may comprise data or information represented in any human-perceivable (preferably, digitally reproducible) form such as text, audio recordings, image recordings, video recordings or combinations thereof represented in any of a number of well-known formats. As such, multiple capture agents, such as those known to the skilled artisan, may be equally employed. As described in greater detail below, the content files generated by the capture agent 108, which is preferably integrated with the dashboard 102 or that may operate as a stand-alone component, may be associated with messages created within the system 100 either concurrently with or subsequent to generation of such messages. Additionally, in one embodiment, an interface, such as that illustrated in FIG. 11 and described in further detail below, may be used to automate the creation of the standardized metadata for use with content files created using the capture agent 108.

Generally, the back-end components 120, 122 operate to manage communications and content files generated by users of the collaboration system 100, including association of messages based on corresponding metadata values and distribution of messages to various users (via corresponding user terminals) of the system 100. To this end, a communication consolidation component 120 is provided to establish and maintain the associations between the various communications (and, where necessary, content files). In the context of the present invention, an "association" between communications alludes to the circumstance in which messages concern related subject matter and may therefore be connected in some manner to maintain context. In a presently preferred embodiment, such association is carried out through establishment of a logical link, such as a pointer, between stored messages. As described below, the consolidation agent 120 ascertains when to establish such associations based on correspondence of metadata appended to the messages. Associations between messages are established in various manners known to those having ordinary skill in the art. For example, in one presently preferred implementation, messages sent within the system are treated as records in a database. Links between such records are established using a technique known as polymorphic association. In this case, all records in the database are associated via foreign keys (pointers). More specifically, messages are sent to recipients (users, workgroups, focus areas) via a polymorphic relationship—the communication consolidation component 120 tracks the message primary key (an identification) as well as the primary key for the recipient (another identification) and the type of recipient. It then retrieves messages sent to the current user as well as the workgroups/focus areas that the user belongs to, by default. Similarly, responses to a message are associated via foreign key relationships to other messages. Reference links are simply stored as text in the database record for the message. Likewise, media or content files are related via many-to-many relationships between messages and media files.

In one embodiment, the communication distribution agent 122 operates to route messages to users of the system 100 based on an interest in the subject matter at hand and/or that are the direct, intended recipients of each message. For example, in the context of a software development team, a given manager may send messages concerning "bugs" that arise during development in the software to a group of recipients that have in interest in the subject of "bugs" to the extent that they are impacted by, or may have an impact upon, the subject matter thereof. Additionally, or alternatively, the manager may wish to send the messages specifically to one or more selected recipients. To facilitate such groups (or work groups), individual users of the system may "subscribe" (or, alternatively, be "subscribed" by an initiator of a message) to receive communications concerning certain subject matter intended for a recipient group as indicated by the metadata associated with each communication. In a more specific implementation, users may instead subscribe to specific discussions or topics. In this manner, the present invention provides the ability to automatically build greater team awareness with minimal additional burden on individual team members. Techniques for allowing users to subscribe to work groups, and for managing such work groups, are well known in the art.

Figure 2:
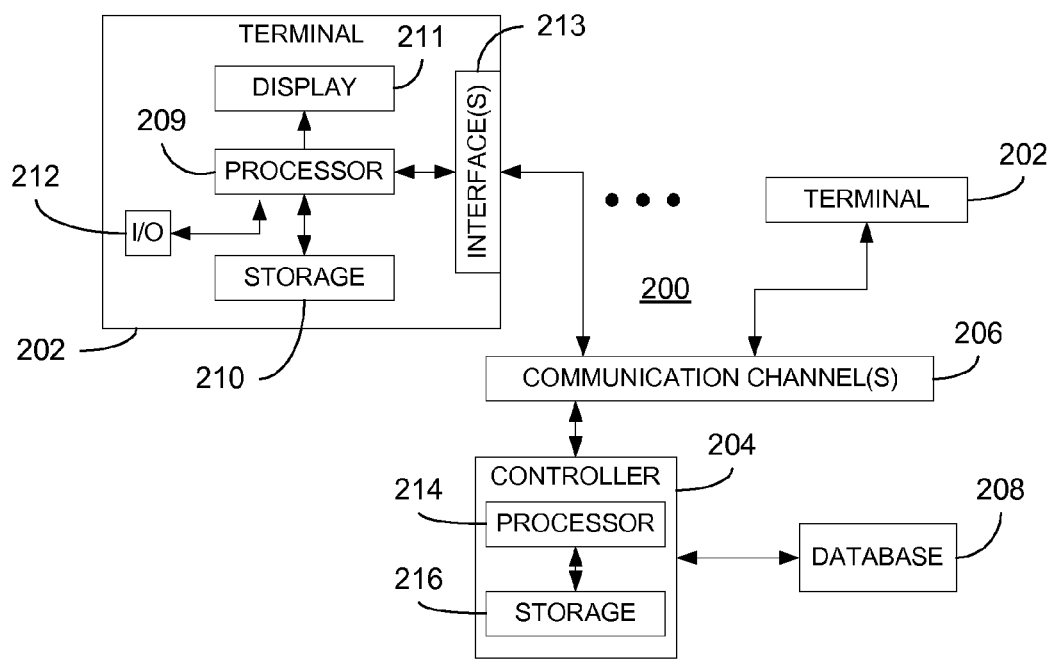
FIG. 2 is a schematic block diagram of a communication system in accordance with an embodiment of the present invention.

FIG. 2 illustrates a schematic block diagram of a communication system 200 that may be used to implement the collaboration system 100 in accordance with one embodiment of the present invention. Generally, the system 200 comprises a plurality of user terminals 202 in communication with each other and a controller 204 via one or more communication channels 206. In a presently preferred embodiment, each of the user terminals 202 comprises a processor-based device such as a computer (or other device) comprising one or more processors 209 in communication with at least one storage component 210. The processor(s) 209 may comprise microprocessors, microcontrollers, digital signal processors, etc. or combinations thereof operating under the control of executable instructions stored in the storage component(s) 210. The storage component(s) 210 may comprise any combination of volatile/non-volatile memory components such as read-only memory (ROM), random access memory (RAM), electrically erasable programmable read-only memory (EEPROM), etc. The executable instructions stored in the storage component(s) 210 may be particularly used to implement processing as described in greater detail below. However, as known in the art, the user terminals 202 may be implemented, in whole or in part, using other components such as ASICs, programmable logic arrays, etc. that may operate under software or hardware control.

As further illustrated, each user terminal 202 preferably comprises a display 211 in communication with the processor(s) 209. As known in the art, the display 211 may comprise an integral or external display such as a cathode-ray tube (CRT), liquid crystal display (LCD), light emitting diode (LED) display, etc. Techniques for providing display data to a display are well known in the art. In a similar vein, the user terminals 202 preferably include user input/output components 212 as well as one or more communication interfaces 213. The I/O components 212 may comprise any user input device or mechanism that allows a user of the user terminal 202 to interact therewith, e.g., a mouse, keyboard, microphone, video and/or still image camera, speaker, etc. The communication interface(s) 213 support the use of the one or more communication channels 206 and typically comprise any combination of hardware and/or software elements necessary to terminate physical links (e.g., Ethernet, wireless, etc.) or communication protocols (e.g., HTTP, SOAP, SSL, TCP/IP, etc.). Techniques for implementing the interface(s) 213 are well known to those having skill in the art.

As noted above, the communication channels 206 may comprise any one or combination of wired or wireless communication channels, depending on the capabilities of the terminals 202 and/or controller 204. Additionally, the communication channels 206 are further defined by the type of communications supported thereby. For example, email communications, voice communications, instant messaging (IM) communications, SMS communications, multimedia messaging service (MMS) communications, etc. may all be supported by different types of communication channels, as known to those of skill in the art. A benefit of the present invention is that the metadata provided in accordance herein allows the collaboration system to organize communications regardless of the underlying type of communication channels employed.

As shown, the controller 204 preferably comprises a processor-based device comprising at least one processor 214 and at least one storage component 216 as described above with regard to the user terminals 202. In a presently preferred embodiment, the controller 204 is implemented using one or more server computers as known in the art. Additionally, the controller 204 is preferably in communication with a database 208 that, as known in the art, can also be implanted using one or more server computers. Generally, the controller 204 implements the functionality described above relative to the back-end components 120, 122 whereas the database 208 stores the data (i.e., messages, content files, links therebetween, etc.) sent between user of the system 200.

Figure 3:
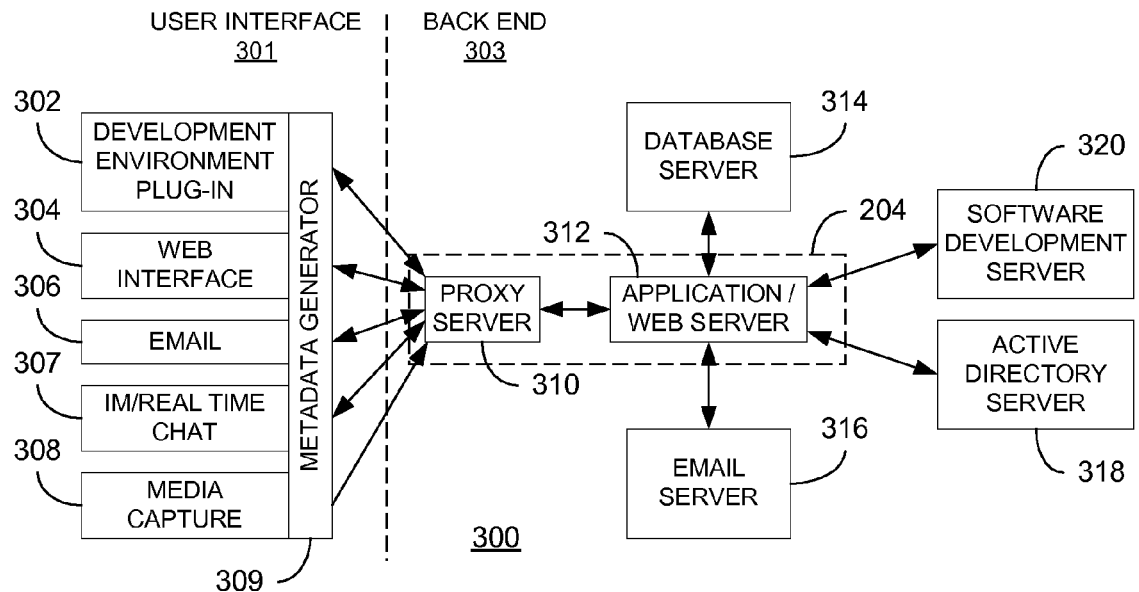
FIG. 3 is a functional block diagram of a collaboration system in accordance with an embodiment of the present invention.

An implementation of a collaboration system 300 showing additional detail regarding implementation of the back-end is further illustrated with regard to FIG. 3. In particular, the collaboration system 300 as shown includes a plurality of user interfaces 301 (only one shown) in communication with the back-end 303. Preferably, the user interface 301 is implemented via the user terminals 202 and carrying out the function of the interface components 102-108 described above. The system 300 illustrated in FIG. 3 is particularly adapted for use in conjunction with software development, although the present invention is not limited to this particular application. Regardless, as illustrated, the user interface 301 includes a development environment plug-in 302, a web interface 304, an email toolbar and interface 306, an instant messaging (IM) or chat interface 307 and a stand-alone media capture interface 308 each operating in conjunction with a metadata generator 309. As known in the art, the development environment plug-in 302 may comprise a plug-in suitable for communicating and operating with a suitable software development program, such as the "ECLIPSE" integrated development environment software program. In general, the plug-in 302 implements substantially similar functionality as the web interface 304, email toolbar interface 306, IM interface 307 or any other interface that provides the ability to generate messages, as described below. The web interface 304 preferably implements the functions of the dashboard 102, described in greater detail below. Similarly, the email interface 306 and/or IM/chat interface 307 preferably implement(s) the functions of the communication template 104, also described in greater detail below. The stand-alone media capture interface preferably implements the functions of the multi-media capture agent 108, described in greater detail below.

The metadata generator 309 operates in conjunction with the various user interface components 302-308 to generate metadata values in accordance with standardized metadata attributes. For example, the metadata generator 309 may receive user selections corresponding to predefined metadata input values, or may comprise received data entered via a user-definable metadata value input field, as described below with further reference to FIGS. 8 and 9. Additionally the metadata generator 309, using known techniques, may populate predefined metadata input fields based on variables known to the system such as date, time, user identification, communication type, etc. Alternatively, more sophisticated techniques can be used to implement the metadata generator 309, particularly techniques that allow metadata to be automatically generated based on analysis of the messages created via the various interfaces 302-308. For example, in the case of communications employing a text format, individual communications can be scanned by the metadata generator 309, using known text parsing techniques, to identify key words that may be used as the metadata. Further still, although the metadata generator 309 is illustrated as a single element in FIG. 3 (reflective of the standardized nature of the metadata generated thereby), in implementation, using techniques known to those of skill in the art, it may be preferable to provide separate components for each of the various user interface components 302-308. Regardless of its implementation, the metadata generator 309 provides metadata values for each communication (message) provided to the back end 303. Through the use of such standardized metadata attributes and values, the present invention is able to create associations between disparate communication channels, thereby creating valuable context to such communications.

As shown, the back end 303 preferably comprises a plurality of server computers 310-320 arranged in a suitable network configuration, a fairly typical example of which is illustrated in FIG. 3. Suitable server computers for implementing the functions of each of the servers 310-320 described below, as well as modifications to the network configuration, are well known in the art of database-backed dynamic web applications. In a presently preferred embodiment, additional implementation techniques are employed, such as using a cluster of virtual servers to implement the application web server 312, or the use of multiple clusters of servers per project collaboration team. Other refinements may be apparent to those having ordinary skill in the art. Typically, each of the servers 310-320 communicates with each other and/or with user terminals via a suitable communication protocol, such as TCP/IP. In the embodiment shown, a proxy server 310 is provided as the interface to the back end 303. In accordance with known techniques, the proxy server 310 provides users of the system 300 indirect access to the services and resources made available by the other back end servers. In the illustrated configuration, the proxy server 310 is in communication with an application web server 312. In a presently preferred embodiment, the combination of the proxy server 310 and the application web server 312 implements the functions of the controller 204 (i.e., the back-end components 120, 122 described above and in further detail below). The application web server 312 is in communication with a database server 314 that stores one or more project profiles, user profiles and communication preferences, identifications of work groups and related/subscribed users, message content, metadata for messages and content files, pointers to content files and the linking information between messages. As known in the art, the email server 316 supports communications between user terminals using an email communication program. More particularly, email communications originating from a given user's terminal (and corresponding interface 301) are first processed by the proxy and web application servers 310, 312 (as described below). Thereafter, such communications can be sent to the intended recipients (e.g., workgroups and/or specific users) via the email server 316 using well known techniques.

The additional servers illustrated comprise an active directory server 318 in communication with the application web server 312. As known in the art, the active directory server 318 allows one or more system administrators to control configuration/operation of the various components within the system 300, including the user terminals. A software development server 320 is also shown in communication with the application web server 312. In the context of software development projects, the software development server 320 may implement a suitable workflow automation tool such as IBM's "RATIONAL" "CLEARQUEST" program. Of course, other servers running applications appropriate for use on different types of collaborative projects may be equally incorporated, using known techniques, as dictated by the particular needs of such projects.

Figure 4:
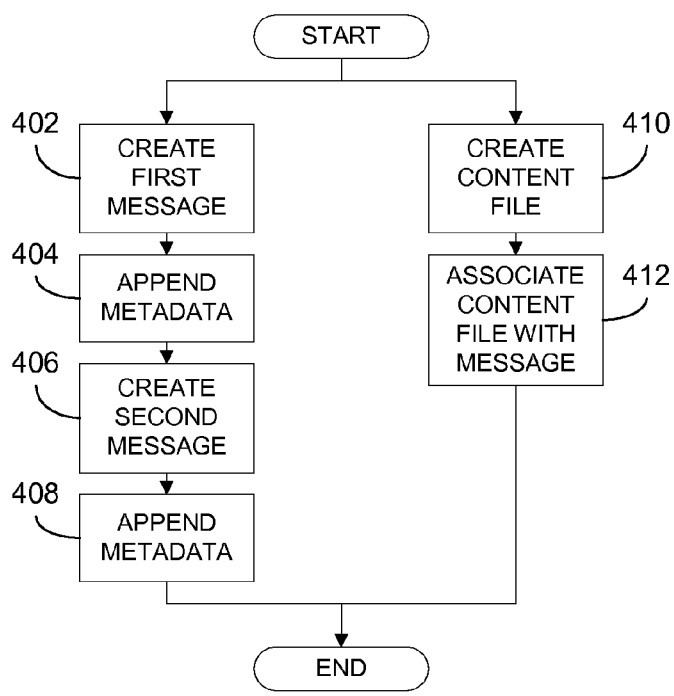
FIG. 4 is a flow chart illustrating operation of a user terminal in accordance with an embodiment of the present invention.

Referring now to FIG. 4, a flowchart illustrating operation of a user terminal in accordance with the present invention is shown. As noted previously, the operations illustrated in FIG. 4 are preferably implemented using stored, executable instructions that control operation of one or more suitable processors. As shown, the processing of FIG. 4 is divided into two separate, parallel paths that may be carried out substantially simultaneously or at different times. Thus, along a first path, processing begins at block 402 where a first message is created by a user of the terminal using a message creation component. As known in the art, a message can be created in any of number of ways depending on the format of the message to be created. For example, an email message can be created through the use of a suitable email program, such as Microsoft's "OUTLOOK" email program, by typing the message using a keyboard. Similarly, an instant messaging program may be used to create an instant message or the dashboard 102/web interface 304 may be used to create a new message, as described below. Regardless of the manner in which the first message is created, processing continues at block 404 where a first plurality of metadata values are appended to the first message. As used herein, appending metadata to a message encompasses inclusion of the metadata in the message itself. For example, the metadata may be transmitted within the same electronic message "envelope" as the message content itself, or may be directly embedded in the message content. Alternatively, the metadata may be stored separately from the message content and "appended" by virtue of a logical link (e.g., pointer values to physical storage locations) between the two. As noted previously, the metadata values correspond to at least some of a plurality of metadata attributes that have been standardized in accordance with the needs of the users of the system. For example, in a software development environment, such standardized metadata attributes may be categorized by type of communication being submitted (e.g., regarding a problem found, asking a question concerning requirements, making an announcement, etc.); by the groups potentially impacted by the communication (e.g., the development group, management, the testing group, etc.); by relevant references (e.g., links to other systems or other users within the system); and/or by status (e.g., priority, urgency, state of completion, etc.) Additional system generated metadata may include the date and timestamp of message creation or modification, the user creating or modifying the message. Once again, the particular standardized metadata attributes are not necessarily limited to those described herein, and may be particularly selected according to the needs of a particular project.

Thereafter, at blocks 406 and 408, the processing described above relative to blocks 402 and 404 may be respectively repeated for the creation of a second message and appending of a second plurality of metadata values. Note that the first and second messages do not have to be created by the same message creation component nor do they have to be communicated by the same communication channel. So long as they both have their standardized metadata values appended thereto, the fact that they have been created using different message types (e.g., email, instant messaging, web interface, plug-in interface, etc.) will not affect the ability of the instant collaboration system to establish context between the two messages. That is, assuming the first and second message are related in some fashion, the first and second pluralities of metadata values should compare favorably such that the first and second message may be subsequently associated together.

In parallel with the first path described above, the second path illustrated in FIG. 4 begins at block 410 where a user creates a content file. As noted above, various tools may be employed to create a content file depending on the format of the content file to be created, i.e., text, audio, images, video, combinations thereof, etc. Additionally, the content file may be created well before or after or substantially at the same time as a message with which it is subsequently associated. As noted previously, corresponding standardized metadata values are preferably appended to content files when such content files are added to the collaboration system, i.e., when the content files are created or uploaded. To this end, a suitable interface may be provided to ensure uniform capture of the standardized metadata, an example of which is further illustrated in FIG. 11.

Figure 11:
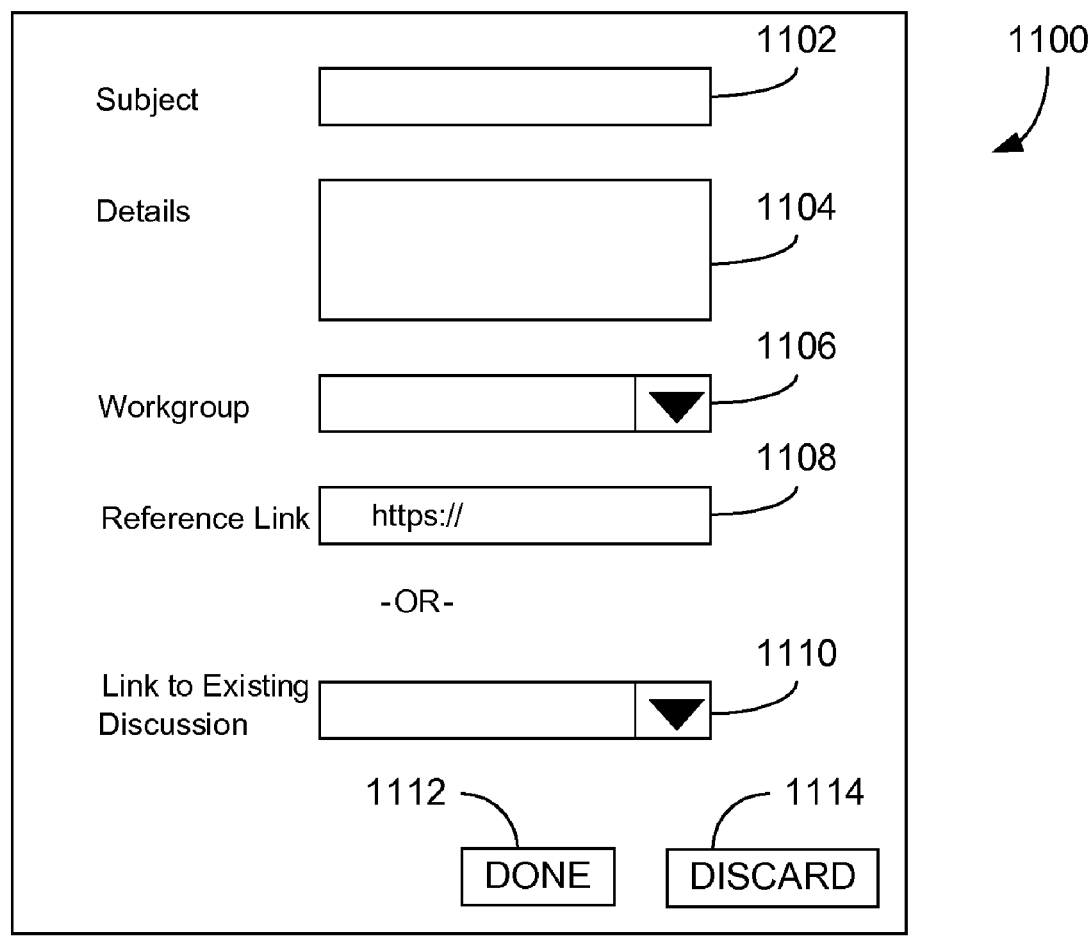
FIG. 11 is an illustration of a media capture input interface in accordance with an embodiment of the present invention.

As shown in FIG. 11, the interface 1100 comprises a number of user input mechanisms (e.g., text boxes, drop down menus, etc.) that allow a user to enter metadata input values. Note that the examples illustrated in FIG. 11 are not intended to be exhaustive of such input mechanisms or the types of metadata that may be captured. In the illustrated example, a text box 1102 is provided for capturing a subject indicator, e.g., the subject matter to which the content file relates. In a similar vein, a details text box 1104 is provided to capture additional information concerning the content file. That is, the details text box 1104 is intended to be freeform, allowing users to provide information/metadata that would be useful to viewers. For example, in a software development project, a user may use this functionality to walk the viewer through a functional problem via a screencast (i.e., a digital recording of computer screen output, often containing audio narration), where the text box 1104 might be utilized to provide prerequisite steps. A drop down menu 1106 is provided as a means for selecting a work group. In this implementation, the drop down menu 1106 provides a predefined list of available work groups (e.g., in the context of a software development project, a Project Management group, Technical Architecture group, Requirements group, Application Design group, Development group, Testing group, Communications group, Deployment group, etc.). A reference link text box 1108 allows a user to enter, in this example, a website address of a website that includes additional relevant information. Of course, other types of addresses (e.g., internal network addresses, etc.) could be equally employed. Further still, a discussion pull down menu 1110 is provided that allows a user to select a particular discussion (as described below) to associate the content file with. In this instance, a list of discussions are maintained (for example, by the controller 204), which list is used to populate the populate the various pull down menu selections. Finally, suitable buttons are provided that allow a user to accept his/her selections 1112 or discard (cancel) 1114 them in accordance with well known user interface paradigms.

The content file created at block 410 is preferably stored at a centralized location, e.g., at the web application server 312, although it is understood that any suitable storage means in virtually any location may be used for this purpose. When being stored, the content files may be uploaded automatically (after being created locally at a user terminal) when the file is created through the system applications, e.g., the media capture agent 308, or created locally by the user in an application external to the system and uploaded, e.g., to the web server 312, at a later time through the dashboard 102. Regardless, at block 412, the content file thus created and stored may be associated with a message, such as a message created in accordance with blocks 402-408 as described previously. Once again, the association of the content file may be carried out through actual co-storage of the message and the content file, or, in a presently preferred embodiment, via logical links between the two (which links are preferably stored, along with the metadata in the database 314). Also, the step of associating the content file with the message may occur substantially simultaneously with or at anytime after creation of the message. For example, as described below relative to FIGS. 8 and 10, either the dashboard 102 or communication template 104 may be used to associate the content file with the message.

Figure 5:
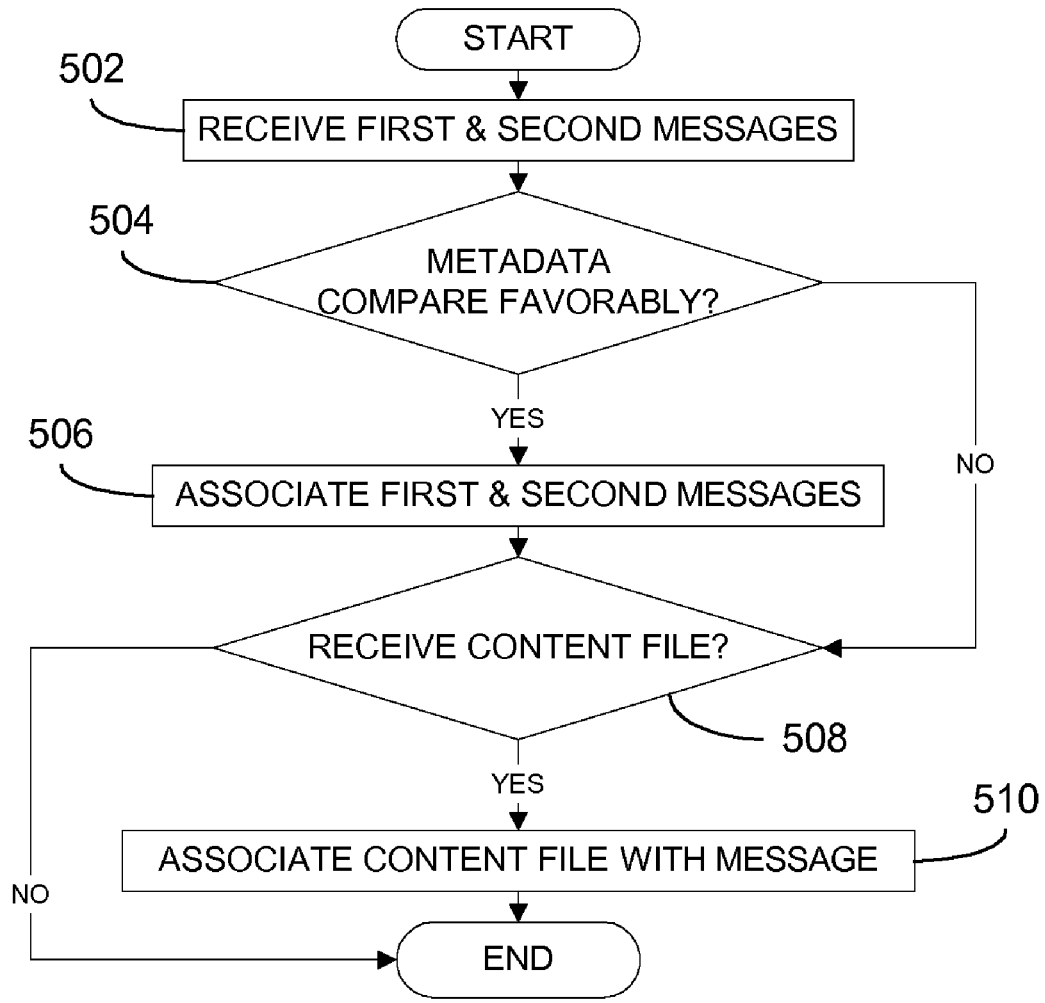
FIG. 5 is a flow chart illustrating operation of a controller in accordance with an embodiment of the present invention.

Referring now to FIG. 5, a flowchart illustrating operation of a controller in accordance with the present invention is shown. As noted above, the operations illustrated in FIG. 5 may be implemented using stored, executable instructions that control operation of one or more suitable processors. Beginning at block 502, the controller receives first and second messages from user terminals. Both the first and second messages have metadata appended thereto as described above. Note that the first and second messages may be received at the controller within a relatively short period of time or at substantially different times, e.g., weeks or even months apart. In order to determine whether the first and second messages should be associated with one another, a comparison of their respective metadata values is undertaken at block 504. As known to those having skill in the art, a variety of techniques for comparing metadata values with each other are available and further description here is not necessary. More importantly, whether the two messages should be associated with each other depends on the relative favorability of the comparison performed at block 504. The standard for assessing such favorability is a matter of design choice. For example, in a presently preferred embodiment, substantially identical metadata values (of at least a subset of the possible standardized metadata attributes) are required. More specifically, it is currently preferred to find a favorable comparison when a given message is a reply to a previous message, hence resulting in virtually identical metadata values, or when the metadata values corresponding to work groups are identical. In this latter vein, association may be proper where a relatively small number of high priority metadata values substantially match. For example, two emails having different creation times and showing different "subject" lines may nevertheless be properly associated together if they have the same author and recipients and contain one or more identical keywords. The present invention is not necessarily limited by the nature of the test used to determine the existence of a favorable comparison.

If the comparison of block 504 is favorable, the first and second messages are associated with each other at block 506. As noted above, this is may be accomplished by establishing one or more logical links or pointers (e.g., through the use of foreign keys) between the messages. For example, each message could include a pointer to the physical location in storage of the other message. References to other discussions (i.e., threads of messages) may likewise be associated via appropriate pointers. In the above-mentioned case of reply messages, such pointers are not necessary as known to those of skill in the art. After establishment of the association at block 506 (regardless of how its implemented), or if the comparison at block 504 was unfavorable, processing may continue at block 508 where it is determined whether a content file has been received by the controller. The manner in which the content file is received may vary, including directly receiving the content file as in the case of an included email attachment, or indirectly as in the case of receiving a reference (e.g., a pointer) to the content file within the centralized, back end storage (e.g., the web application server 312) or in a local user terminal. In a presently preferred embodiment, the dashboard 102 may be used at a user terminal to manipulate graphical representations of content files and thereby associate them with specific messages. Regardless of the manner in which the controller receives the content files, processing thereafter continues at block 510 where the content file is associated with a message. Those of skill in the art will recognize that individual content files could be associated with more than one message. Once again, such one-to-one or one-to-many association may be accomplished through the use of pointers to storage locations. Other techniques may be used as a matter of design choice.

Figure 6:
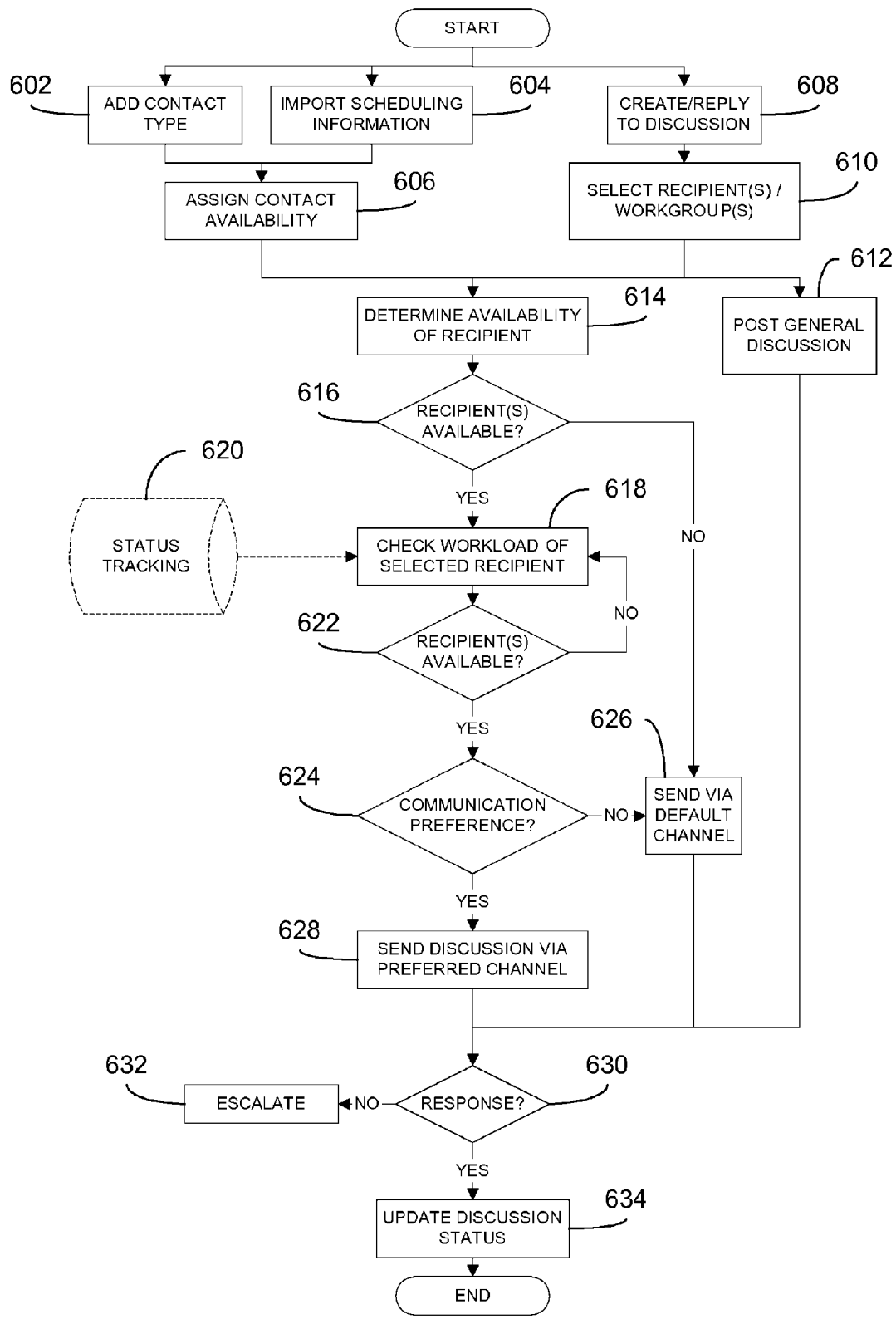
FIG. 6 is a flow chart illustrating a distribution process in accordance with an embodiment of the present invention.

In another aspect of the present invention, the distribution of messages is controlled, at least in part, by the particular members of a group designated to receive the messages, the preferred communication channels of such members and the workload of each recipient. An example of such a process in accordance with a presently preferred embodiment is illustrated in FIG. 6. Once again, the processing illustrated in FIG. 6 is preferably implemented using appropriately programmed processors of the types described above, both within the user interface 301 and back end 303. As illustrated, the various processing blocks 602-634 may be generally grouped into three distinct groups. In a first group, comprising blocks 602-606, information concerning availability and preferred communication channels of a user is managed. In a second group, comprising blocks 608-610, initiation of discussions, as described below, is provided. Finally, in the third group comprising blocks 612-634, distribution of specific messages, including delivery to specifically designated recipients is further illustrated.

Beginning at block 602, a user of the system may provide any necessary information to configure a particular contact type, i.e., communication channel. That is, in a presently preferred embodiment, a user can designate specific communication channels to be used to contact that user in accordance with rules or preferences of the user's own design. In a preferred embodiment, the dashboard 102/web interface 304 is used for this purpose, as described below. Thus, for example, during normal business hours in which the user does not have previously scheduled appointments, the user may designate that his/her office email account should be used to receive incoming messages without any further attempts to alert the user. Conversely, after normal business hours or during periods of time during which the user has previously scheduled appointments, the user may designate that, in addition to routing all incoming messages to his/her email account, a message should also be sent to the user's mobile phone via, for example, SMS. Those having ordinary skill in the art will appreciate that known techniques may be used when establishing such rules. Generally, the configuration information provided by the user at block 602 may be stored in any suitable storage device although, in a presently preferred embodiment, it is stored by the database 208.

In parallel, at block 604, scheduling information for the user may be imported into the system, i.e., via the web server 312. In a presently preferred embodiment, the scheduling information may comprise information taken from an electronic calendar or similar mechanism. As known in the art, such scheduling information is indicative of the time, places, etc. of appointments for a given user and may be encoded in a conventional manner. Regardless, at block 606, contact availability for the user is established based on the imported scheduling information from block 604 when overlaid with the contact rule types established at block 602. In this manner, the present invention allows users to very specifically tailor the communication channels at their disposal to their personal needs and schedules.

Within the second group of blocks described above, i.e., concerning the initiation of discussions, processing begins at block 608, where a user may initiate or respond to a discussion using any of the above described user interfaces, e.g., the dashboard 102, communication template 104 or plug-in interface 106. Using known techniques (such as predetermined pull-down menu entries or the like in a graphical user interface), the user can elect to create a new discussion or reply to an existing discussion. As used herein, a discussion is a thread of associated messages (and, possibly, content files, as described above) concerning a particular topic or subject. The "breadth" of such discussions, i.e., the size of the group of desired recipients, may be controlled in part through the manner in which the discussions are initiated. For example, by initiating a discussion to a specific workgroup, as illustrated at block 610, a relatively broad audience may be established initially. Alternatively, or in addition, selection of specific, individual recipients of a discussion allows the creator of a discussion to more closely manage its intended audience. Regardless, as described below, the controller 204, when it receives a message to be distributed to designated recipients and workgroup members, undertakes a two-pronged delivery process in which it evaluates each recipient's availability for individual delivery of the message, as well as a general "posting" of the message to a discussion thread that is always available via the dashboard 102, as described below.

Within the third group of blocks, i.e., concerning the distribution of messages to their designated recipients, processing is once again split along two parallel paths. Along the first path, embodied by block 612, all messages (whether the beginning of a discussion or in response to an existing discussion), are posted to the discussions to which they pertain. In a presently preferred embodiment, this includes publishing the message as part of a discussion to be displayed on the dashboard 102. That is, using the association process described above, the message is posted as part of a discussion thread based on its association with one or more messages in that thread.

In parallel, and assuming individual recipients of a message were designated at block 610, processing proceeds in parallel at block 614 where the controller 204 determines availability of recipients of the message, including individual members of any designated work group, by reference to such recipients' respective scheduling information. If, at block 616, it is determined that individual recipients are not available, processing continues at block 626 where the message is sent via a default communication channel to such recipients. Such default communication channel is preferably a relatively ubiquitous, non-intrusive channel type, such as email, although other channels may be used for this purpose as a matter of design choice.

In one aspect of the present invention, the distribution of messages to designated recipients may be based, at least in part, upon the workloads of each designated recipient. This is illustrated at block 618 where the individual workloads of each selected recipient is determined. In a presently preferred embodiment, individual workloads are assessed through reference to status tracking data 620. Status tracking information refers to status reports of individual users concerning their daily activities including, but not limited to, goals achieved, activities engaged in, etc. as provided by individual users of the system. Virtually any method (although preferably automated) for gathering such information may be employed by the present invention. For example, a presently preferred technique for generating such status tracking information is disclosed in co-pending U.S. Patent Application having Ser. No. 11/686,736, filed on even date herewith and incorporated herein in its entirety. Those having ordinary skill in the art will appreciate that various other techniques for determining the workload of individual recipients may also be used with the present invention. In accordance with this embodiment, those recipients having a favorable workload are selected to receive the message. For example, a designated recipient having a currently excessive workload may be excluded from receiving the message so as to minimize the burden placed on that particular user. Conversely, the user, having a currently light workload may be selected as a recipient as it is presumed that the user will have the necessary time to consider the message. Those having skill in the art will appreciate that various techniques may be employed to determine the favorability of an individual's workload. For example, in one embodiment, at least three factors are combined to assign each recipient an individual score, including the recipient's activity as indicated by the specific tasks assigned to the recipient per a project plan as well as previous messages sent to the recipient. Additionally, task alignment between the subject matter of the message and the designated recipient's assigned task may also be assessed for this purpose. By combining metrics representative of these three factors using known techniques (e.g., total score, average, weighted average, etc.) the individual scores may be assigned and compared to a suitable threshold selected as a matter of design choice. Regardless of the manner in which workload is determined and assessed, processing continues at block 622, it is determined whether each individual recipient is available based on his/her workload per block 618.

Thereafter, processing continues at block 624 where it is determined, for each remaining recipient, if the recipient has a communication preference for receiving such messages. If not, processing continues at block 626 where the message is sent via the default communication channel as described above. If, however, the recipient has designated a preferred communication channel, processing continues at block 628 where the message is sent to each such recipient via his/her preferred channel.

Regardless whether a given message has been only generally posted as per block 612, sent via a default channel to as per block 626 or via preferred channel as per block 628, processing thereafter continues at block 630. At block 630, it is determined whether a response has been received (by the controller) to the message posted at block 612 or sent at block 626, 628. In one embodiment of the present invention, it may be desirable to escalate the importance of the message in the event a response has not been received to that message, as illustrated at block 632. In this context, such escalation may include sending the message to other recipients as indicated by a project plan. For example, the project plan may include listings of each user's supervisor and the supervisor's contact information. In one embodiment of the present invention, the threshold for determining whether to escalate a given message is based, at least in part, upon designations assigned by the message initiator. For example, a specific period of time for response may be assigned, such as "within the next two hours", etc. Alternatively, specific priorities may be assigned with the understanding that higher priority messages are escalated more quickly than lower priority messages (in accordance, for example, with a defined escalation scheme defined by a project plan). Further still, project structure according to the project plan may be employed for targeting specific, additional recipients. Thus, if escalation is required, the message could be sent to the supervisors of one or more of the originally intended recipients. In the process of selecting such additional recipients according to the escalation need, the previously described process of assessing a recipients availability (i.e., immediate availability per his/her calendar, work load availability per the multifactor assessment) may employed. If, on the other hand, a response is received at block 630, processing continues at block 634 where the status of the discussion to which the message pertained is updated. For example, such update of status may include closing out the discussion, raising priority of the discussion, or any other appropriate status update.

Figure 7:
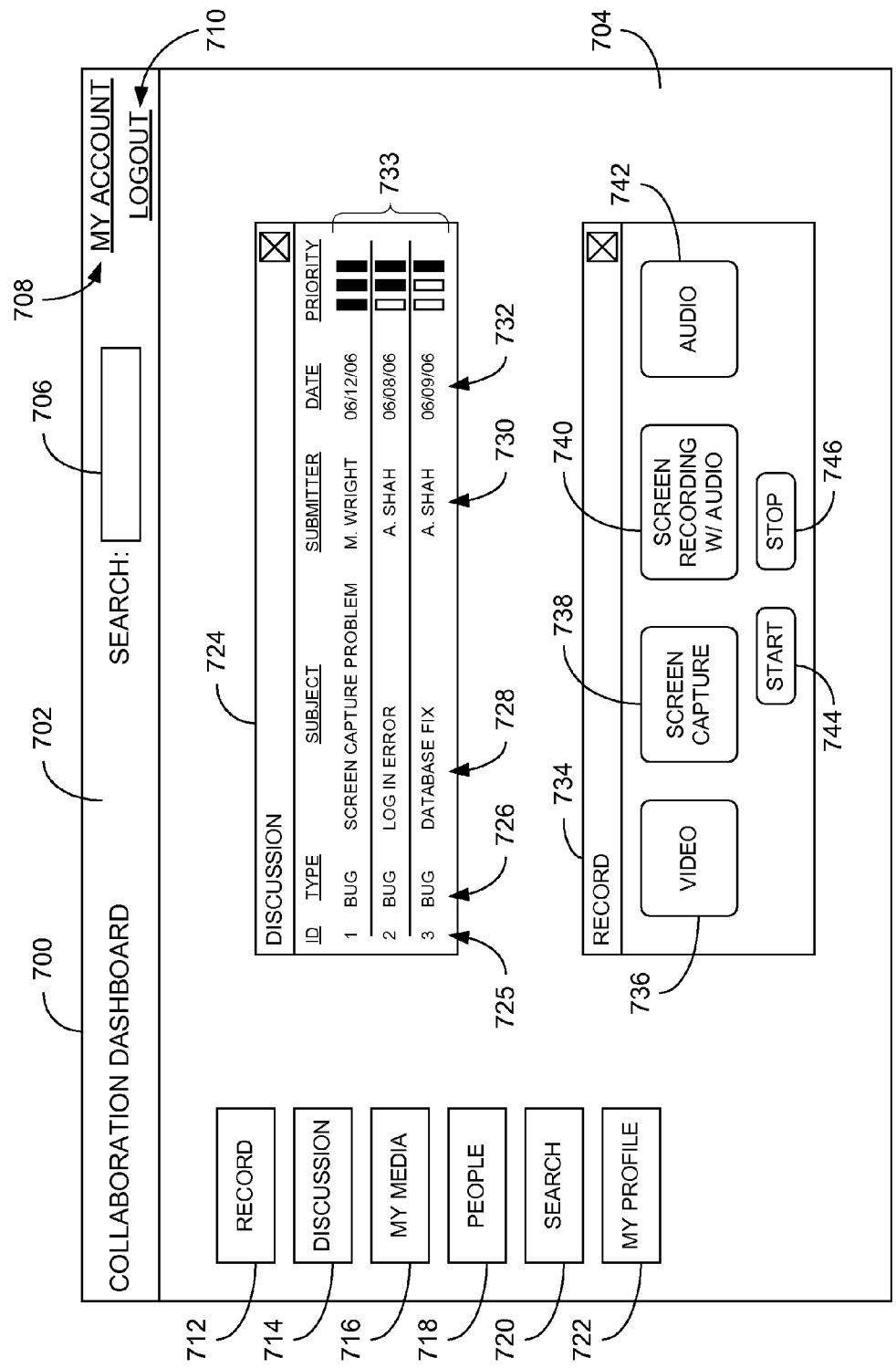
FIGS. 7 and 8 illustrate various features of a user interface in accordance with an embodiment of the present invention.
Figure 8:
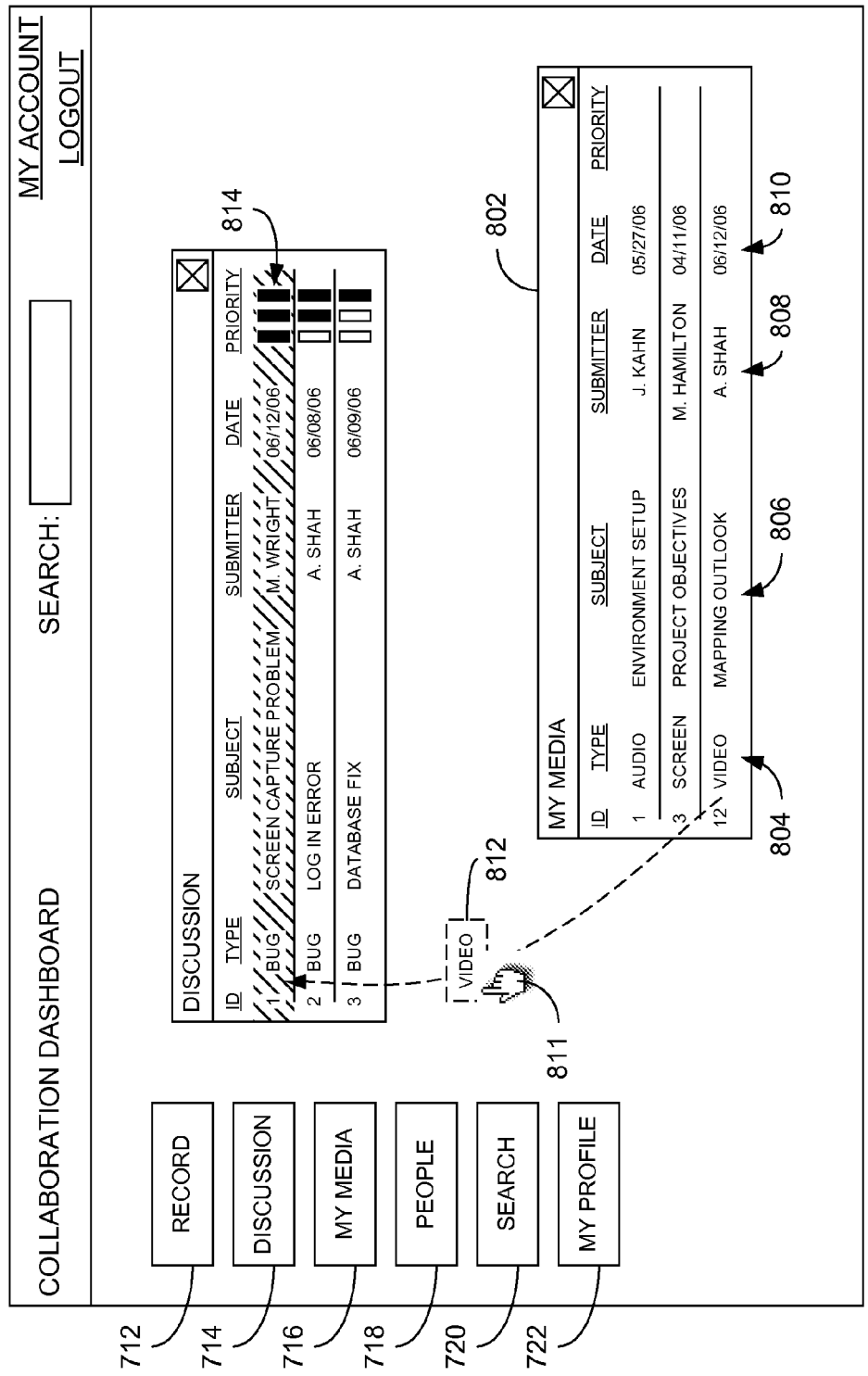

Referring now to FIGS. 7 and 8, an exemplary web application-based user interface 700 in accordance with the present invention is further illustrated. Techniques for implementing such graphical user interfaces are well known to those having ordinary skill in the art. In accordance with the present invention, the interface 700 is an implementation of the dashboard 102 described above, although it is understood that other implementations of the dashboard 102 may be equally employed. To this end, and as shown, the interface 700 comprises a title bar 702 and a display window 704 in a manner similar to the desktop interface paradigm used by many computer operating systems. The title bar 702 may include a search box 706 implemented and operated in a conventional manner, as well as an account selection and logout mechanisms 708, 710 implemented in this example as textual hyperlinks.

Within the display window 704, a plurality of user selection mechanisms 712-722 are illustrated as selectable buttons. In particular, a Record button 712 is provided that may be selected to instantiate one or more media capture agents as described above. For example, assuming that the Record button 712 has been selected, a record window 734 is illustrated having displayed therein a further plurality of selectable buttons, including a video recording selector 736 that may be used to instantiate a video recording program, a screen capture selector 738 that may be used to capture an image of a screen on a computer, a screen capture and audio recording selector 740 that may be used to capture one or more screen shots while simultaneously recording audio, and an audio selector 742 that may be used to initiate audio recording only. Other recording types or combinations of types may be equally employed as a matter of design choice. Start and stop buttons 744, 746 are provided to initiate and terminate recordings after the desired recording mode is selected.

A Discussion button 714 is provided to instantiate a discussion window 724 that may be used to view user-selectable discussions (i.e., one or more associated messages and, possibly, content files) relevant to a user (or a group of which the user is a member). By selection of an individual discussion item, a window setting forth the relevant messages (and associated content files) may be displayed. In a presently preferred embodiment, each item may include a variety of information including a discussion identifier 725 and a discussion type 726. The identifier 725, preferably automatically provided by the controller managing the discussions, may comprise any indicia that allow a discussion to be uniquely identified (in the illustrated example, a unique numerical identifier), and the discussion type 726, preferably user-configurable, sets forth some attribute value of the discussion useful for categorizing separate discussions. In the example shown, each of the discussions is of the "Bug" type, meaning that the discussion concerns a problem identified in the software being developed by the collaborative team. Of course, other types may be defined as a matter of design choice. Note that the example in FIGS. 7 and 8 illustrate only three discussions; in practice, many more discussions (or fewer) may be displayed using, for example, a scrolling window. A subject indicator 728 allows for a simple, short description of the subject matter of the discussion. The submitter and date indicators 730, 732 respectively indicate the identity of the person that initiated the discussion and the date on which the discussion was initiated. Finally, priority indicators 733, which may be associated with corresponding ones of the discussions, may be provided as a visual indicator of the relatively importance or urgency of each discussion. As described below, the priority of a discussion may be set by the user initiating the discussion or modified by the initiating user (or, alternatively, other users) at a subsequent time using, for example, the corresponding priority indicator 733 presuming that the indicator 733 is made user-selectable and modifiable using known techniques. In a presently preferred embodiment, the attributes 725-733 of each discussion may be used to sort and/or filter the displayed discussions in accordance with known sorting and filtering techniques.

With further reference to FIG. 8, the My Media button 716 is used to instantiate a media window 802 that allows a user to view information concerning one or more media (content) files created or received by that user. For example, as shown in FIG. 8, the listing for each media file may include a media file identification 803 that comprises any indicia that may be used to uniquely identify the corresponding media file. A media type indicator 804 is also provided to help identify the type of media used to record the content file, e.g., audio, video, screen image, etc. A subject indicator 806 provides a brief textual description of each content file. As before, the submitter and date indicators 808, 810 indicate who created the file and when the file was created.

One feature of the present invention is the ability to associate the media or content files with particular messages or discussions via the web application interface 700. In particular, so-called "drag-and-drop" functionality may be employed to allow a user to drag a file icon 812 using an input selector 811 to a targeted discussion 814 and, by this action, cause the media file underlying the file icon 812 to be associated with the targeted discussion 814. Using known communication techniques, this action may cause a message to be sent to the controller 204 indicating that the media file is to be associated with the discussion or message. In this manner, significant context may be established for each given discussion, thereby allowing team members to develop better understanding of the communications being exchanged.

In addition to the buttons 712-716 described above, a People button 718 may be provided thereby allowing a user to view or search a listing of other collaborators using the collaboration system. Using this mechanism to identify specific collaborators, profiles of each selected collaborator may be viewed to view current profile information. For example, such profiles may include a picture of the collaborator, contact information (including preferred contact modalities), titles, work locations, group memberships, time zone information and presence information (e.g., currently logged in, busy, etc.) of each collaborator. In this manner, individual collaborators may quickly learn about each other. A Search button 720 provides an alternate method to access search functionality and the My Profile button 722 allows each user to update his/her own personal profile information, which may include designations of what types of profile information may be viewed by different entities, e.g., certain key personnel may be allowed to view a manager's home contact information whereas other personnel may be restricted from viewing such information. In accordance with blocks 602 and 604 described above relative to FIG. 6, the My Profile button 722 may be used to invoke the necessary user interface(s) (as known in the art) to manage/edit communication channel preferences and rules regarding same, as well as the user's scheduling information.

Figure 9:
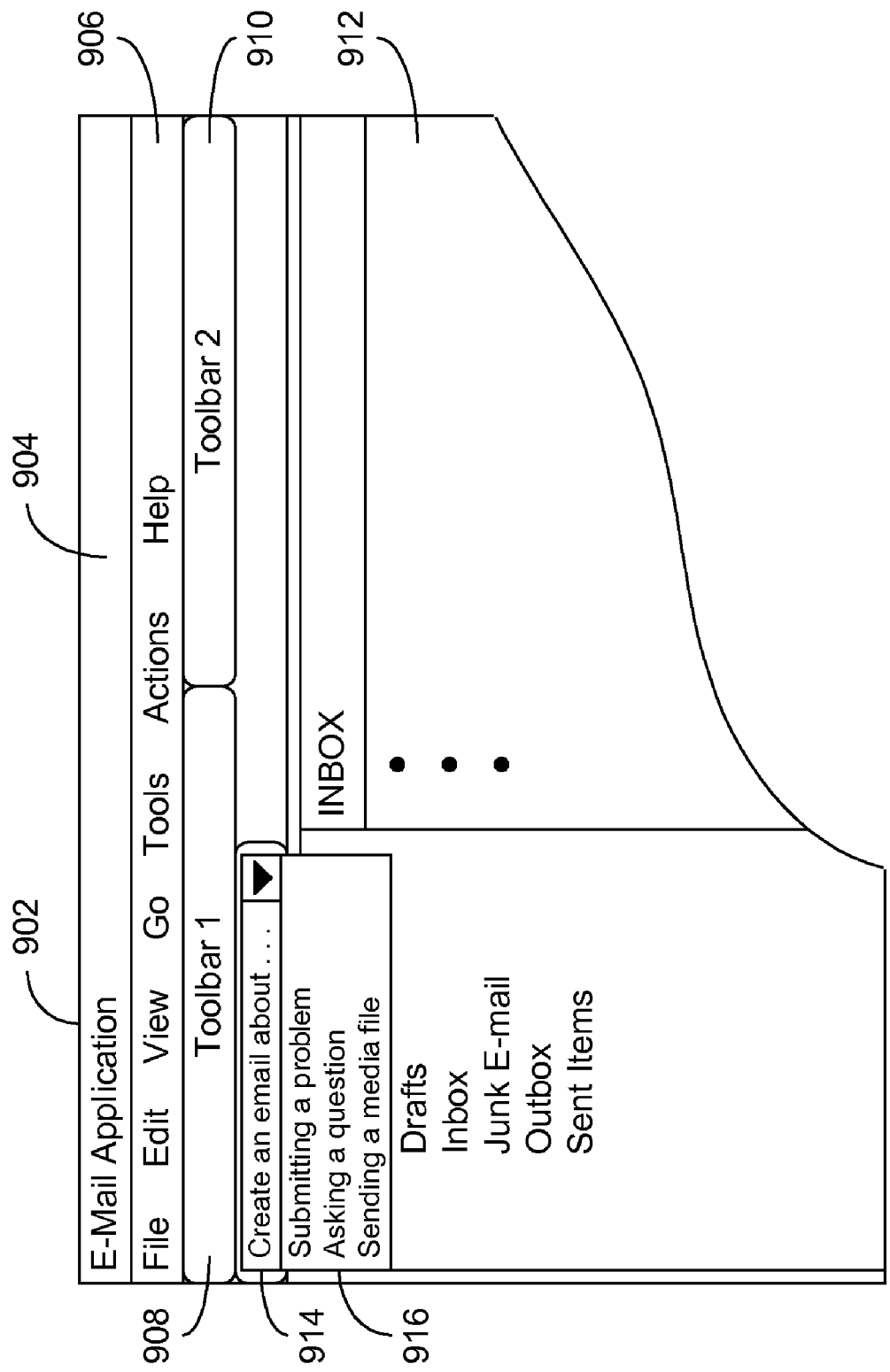
FIG. 9 is an illustration of an email interface in accordance with an embodiment of the present invention.

Referring now to FIG. 9, an implementation of a communication toolbar is illustrated in the form of an exemplary email interface 902. In particular, the email interface 902 is based on the familiar Microsoft "OUTLOOK" email program interface and includes a title bar 904, a menu bar 906 comprising the typical email menu items and one or more toolbars 908, 910, and a display window 912 (in this case, displaying a user's "Inbox") as known in the art. Additionally, a user input mechanism 914 is provided (in this case, in the form of a pull down menu) that allows a user to select one of a plurality of selectable predefined metadata input values 916. As known to those having skill in the art, user-selectable input mechanism 914, rather than providing a predefined list of potential metadata values 916, may instead comprise a user-definable metadata value input mechanism such as a blank text box. Additionally, although a single input mechanism 914 is illustrated in FIG. 9, it may be desirable to include a plurality of such mechanisms (either identical or different in operation) to accommodate the possibility of entering multiple metadata values. This is further illustrated with respect to FIG. 10.

Figure 10:
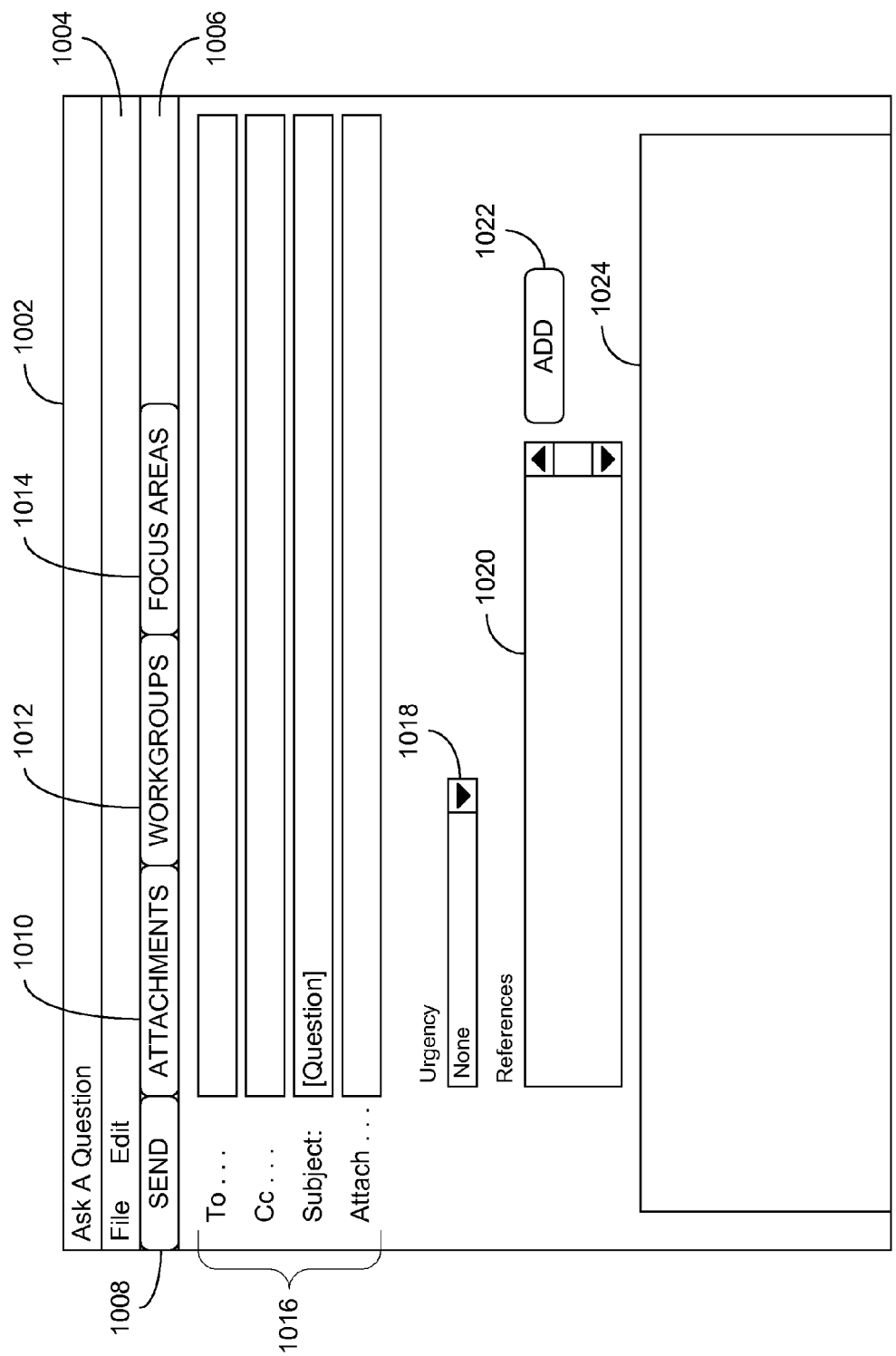
FIG. 10 is an illustration of an email input interface in accordance with an embodiment of the present invention.

FIG. 10 illustrates a message window 1002 that may be instantiated in response to selection of the "ask a question" metadata value 916 illustrated in FIG. 9. As shown, the message window 1002 includes the familiar menu bar 1004 and message editing window 1024 employed by many email programs. A control bar 1006 is provided that sets forth various user-selectable control buttons including a send button 1008 and file attachment button 1010, which may be used to append content or media files to the message, as known in the art. In furtherance of the creation of metadata, a workgroup button 1012 and a focus area button 1014 are also preferably provided. The workgroup button 1012 allows a user to select from a list of predefined workgroups, e.g., Project Management, Technical Architecture, Requirements, Application Design, Development, Testing, Communications, Deployment, etc. that reflect the particular organization of the collaborative team, with each possible selection comprising a potential metadata value. In a similar vein, the focus areas button 1014 may allow further definition of relevant entities within each workgroup as designated by particular functions within each workgroup, or particular issues that are typically associated with a given workgroup. In a presently preferred embodiment, both the workgroup and focus area entries may be defined as a set of customized values. In this manner, useful, context-building metadata concerning the message may be captured and stored for use as described above.

Further metadata input mechanisms are illustrated in the form of addressing inputs 1016 comprising the familiar data entry fields for recipients of the message (the "To" and "Cc" fields), the subject of the message (in this instance, automatically prefilled by a "Question" indicator as dictated by the original selection of the "ask a question" metadata value) as well as an attachment input field. An urgency input selector 1018 is provided to allow a message creator to set an urgency or priority level for the message using, in this instance, a drop down menu. Further still, the combination of a references field 1020 and corresponding add button 1022 allows a user to selectively add additional information to the message, such as information concerning relevant website addresses, contact people or content files. Each of these input mechanisms constitutes an additional source of metadata values that may be appended to the resulting message.

As noted previously, while the example of FIGS. 9 and 10 concerns an email interface, similarly functioning interfaces may also be used to develop templates for other communication modalities, such as the above-mentioned IM, SMS or MMS channels using techniques known to those of skill in the art. Additionally, any combination of the input and display mechanisms described above with regard to FIGS. 7-10 may be incorporated into a suitable plug-in component 106 that generates an appropriate interface within the corresponding main program for which it is designed, again using known implementation techniques. For example, in the context of a software development tool, an interface may be provided that lists the same information shown in the discussion window 724 described above. In this manner, a more effective presentation of development-related communications may be provided.

Figure 12:
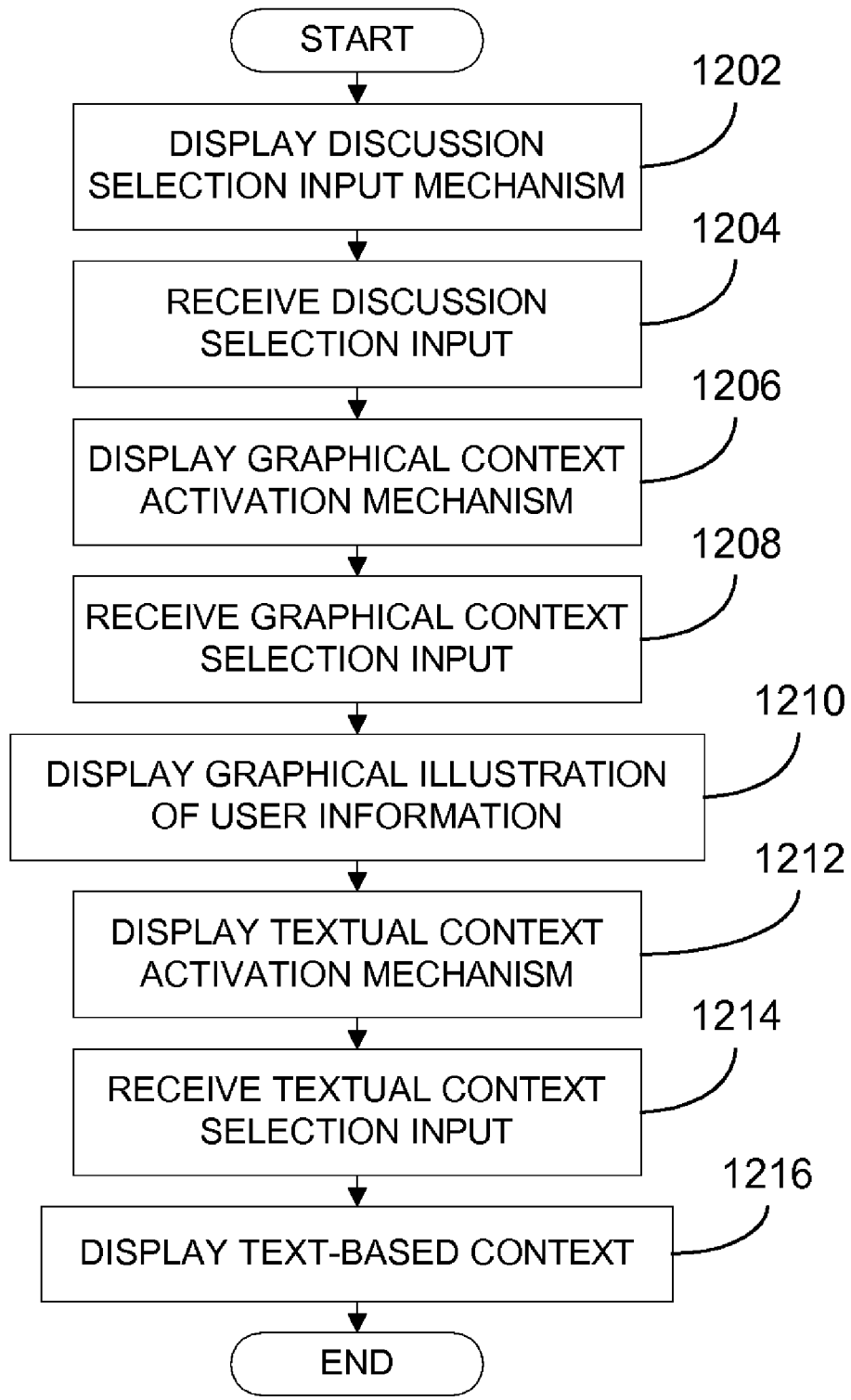
FIG. 12 is a flowchart illustrating operation of a user terminal in accordance with another embodiment of the present invention.
Figure 13:
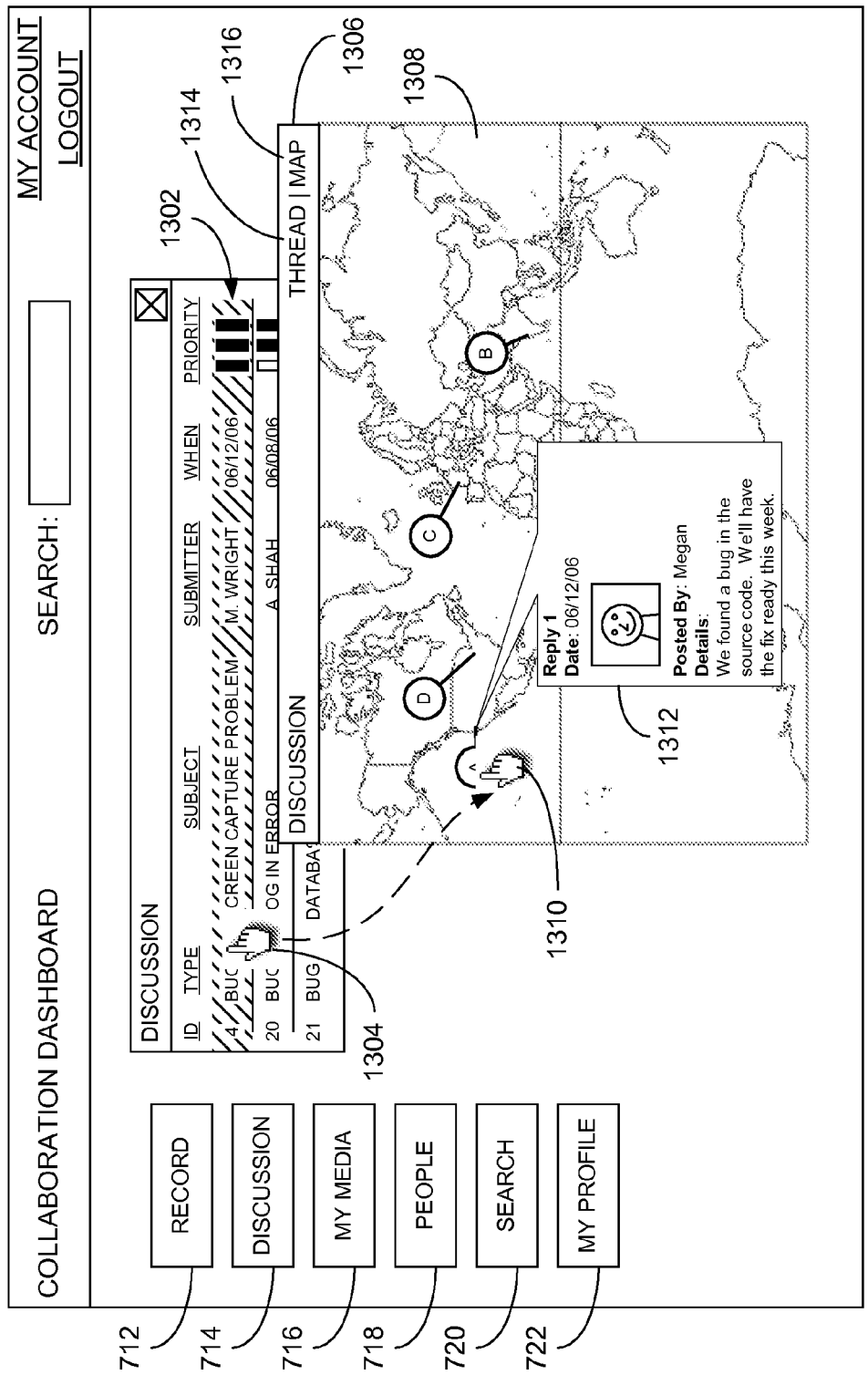
FIG. 13 is an illustration of a user interface depicting various features used to provide context in accordance with the present invention.

Referring now to FIG. 12, a flowchart describing operation of a user terminal in accordance with another embodiment of the present invention is further illustrated. As noted above, the operations illustrated in FIG. 12 may be implemented using stored, executable instructions that control operation of one or more suitable processors in a processing device such as a user terminal. Beginning at block 1202, at least one discussion selection input mechanism is displayed on a display of the processing device. For example, as illustrated in FIGS. 7 and 13, a variety of discussion items, representative of one or more messages between users of the collaboration system, may be displayed in a discussion window 724. In a presently preferred embodiment, each of the discussion items is represented as a textual hyperlink 1302 thereby allowing a user of the device to select the text of one of the represented discussions using, for example, a user input device such as a mouse and cursor combination. Those having skill in the art will appreciate that other mechanisms, both for displaying the discussion selection input mechanism and for selecting same, may be equally employed for this purpose.

Regardless of the manner in which the discussion selection input mechanism is implemented, processing continues at block 1204 where the processing device receives a discussion selection input corresponding to one of the displayed discussion selection input mechanisms. In response to the discussion selection input, additional information regarding the selected discussion is provided on the display, as described in further detail below.

In accordance with the present invention, the information regarding the selected discussion may comprise either a text-based representation or a graphical illustration. For example, in a presently preferred embodiment, the selection input received at block 1204 causes a text-based representation (not shown in FIG. 13) to be displayed by default. As known in the art, the text-based representation may comprise a thread of the messages forming the discussion. Techniques for displaying such threads are well known in the art. However, further in accordance with the present invention, a graphical context activation mechanism is also displayed as indicated by block 1206. As used herein, a graphical context activation mechanism may comprise any user-selectable mechanism that may be displayed on a display, such as a hyperlink, checkbox, pull-down menu item, etc. Selection, at block 1208, of the graphical context activation mechanism (using similar user input devices as described above) causes graphical illustration to be displayed, at block 1210, which graphical illustration includes information regarding the users relevant to the selected discussion. This is further illustrated in FIG. 13.

As shown, a targeted discussion 1302, represented as a hyperlink, may be selected using a cursor 1304 as described above. In response to this selection input, a text-based representation (not shown) may be displayed in a suitable window 1306. The window 1306 preferably includes alternative display mechanisms: a textual context activation mechanism 1314 and a graphical context activation mechanism 1316.

Upon selection of the graphical context activation mechanism 1316, a graphical illustration 1308 is displayed in the window 1306 in accordance with known techniques. In a presently preferred embodiment, the graphical illustration 1308 comprises a geographical map such as a world map. As those of skill in the art will appreciate, the map employed for this purpose may comprise a world map (as shown) or a smaller map focused on a specific region. It is further understood that the graphical illustration 1308 may be represented in a variety of forms other than a geographical map, for example, an organization chart illustrating particular users within the context of an organization hierarchy may be employed. Further still, the graphical illustration 1308 may comprise a visual description of a related application about which users may provide feedback or commentary. Still further alternatives will be evident to those of skill in the art.

As shown, the map 1308 may include indicia of location of each of the relevant user, in this case illustrated by the "pins" labeled A through D. For example, pin A indicates that a user is located in Northern California; pin B indicates that another user is located in Mumbai, India; pin C indicates that yet another user is located in Paris, France; and pin D indicates that still another user is located in Northern Illinois. Further selection 1310 of individual pins may cause additional information 1312 regarding a specific user to be further displayed. In the example shown, the additional information 1312 comprises an overlay window displaying information identifying the user (such as a name or a visual depiction of the user), relevant contact information as well as information concerning that user's contribution(s) to the discussion, e.g., date of posting, text, etc. In this manner, the present invention enables context of a discussion to be quickly established in a graphical manner. Of course, other forms indicating location of respective users may be equally employed as a matter of design choice. For example, straight text listings divorced from the map illustration may be used to identify user locations, user identities, etc.

Referring once again to FIG. 12, processing continues at block 1212 where a textual context activation mechanism is displayed, e.g., the textual context activation mechanism 1314 illustrated in FIG. 13. Once again, the textual context activation mechanism 1314 may be implemented as a textual hyperlink, as shown, or using any other method known to those of skill in the art. Regardless, when the textual context activation mechanism is selected, a textual context selection input is received by the processing device at block 1214 and, in response, text-based context, e.g., a textual display in the form of a discussion thread, is provided at block 1216. Using the textual and graphical context activation mechanisms 1314, 1316, a user is able to switch back and forth, if desired, between graphical and textual context-providing representations of the discussion, thereby enhancing contextual understanding.

As described above, the present invention provides a collaboration system that organizes communication channels between collaboration team members, builds context around communications between team members and provides tools for better developing relationships between collaborators. In one aspect, this is achieved through the use of graphical/textual context activation mechanisms that allow a user to display a discussion between collaborators in a graphical or textual format, thereby providing additional context. For at least these reasons, the present invention represents an advancement over prior art techniques.

While the particular preferred embodiments of the present invention have been shown and described, various changes and modifications may be made without departing from the teachings of the invention. For example, although the textual representation of a discussion is the preferred default when in response to a discussion selection input as described above, it is understood that the graphical representation could be designated as the default as a matter of design choice. It is therefore contemplated that the present invention cover any and all modifications, variations or equivalents that fall within the scope of the basic underlying principles disclosed above and claimed herein.

What is claimed is:

1. In a processing device having a graphical user interface including a display and at least one user input device, a method for establishing a context of a discussion between users of a collaboration system, the method comprising:
    displaying, on the display, a plurality of discussions between users of the collaboration system;
    selecting, via the at least one user input device, the discussion from the plurality of discussions;
    displaying, on the display, a graphical context activation mechanism associated with the discussion;
    receiving, via the at least one user input device, a selection input indicating that the graphical context activation mechanism has been selected; and
    displaying, based on the selection input, a graphical illustration of information regarding the users participating in the discussion,
    wherein the graphical illustration of the information regarding the users comprises an organization chart illustrating at least one of the users in an organization hierarchy;
    wherein the graphical illustration of the information regarding the users further comprises at least one pin on a geographical map indicating a location of at least one of the users; and
    wherein selection of the at least one pin causes display of an overlay window displaying information concerning at least one of the users' contact information and contribution to the discussion.

2. The method of claim 1, wherein the information regarding the users further comprises indicia of identity of at least one of the users.

3. The method of claim 2, wherein the indicia of identity of the users comprises visual depictions of at least one of the users.

4. The method of claim 1, further comprising:
    displaying, on the display, a textual context activation mechanism associated with the discussion;
    receiving, via the at least one user input device, another selection input indicating that the textual context activation mechanism has been selected; and
    displaying, on the display based on the other selection input, a text-based context regarding the discussion.

5. The method of claim 4, wherein the text-based context comprises at least a portion of the discussion.

6. In a processing device having a graphical user interface including a display and at least one user input device, a method for establishing a context of a discussion between users of a collaboration system, the method comprising:
    displaying, on the display, a graphical context activation mechanism associated with the discussion;
    receiving, via the at least one user input device, a selection input indicating that the graphical context activation mechanism has been selected;
    displaying, based on the selection input, a graphical illustration of information regarding the users participating in the discussion; and displaying, on the display, at least one discussion selection input mechanism, wherein the at least one discussion selection input mechanism comprises indicia regarding at least one discussion, the indicia regarding the at least one discussion further comprising at least one of a plurality of priority levels associated with at least some of the at least one discussion, wherein the graphical illustration of the information regarding the users comprises an organization chart illustrating at least one of the users in an organization hierarchy;

wherein the graphical illustration of the information regarding the users further comprises at least one pin on a geographical map indicating a location of at least one of the users; and wherein selection of the at least one pin causes display of an overlay window displaying information concerning at least one of the users' contact information and contribution to the discussion.

7. An apparatus for use with a collaboration system, comprising:

a display;

at least one user input device;

at least one processor in communication with the display and the at least one user input device; and a storage device, in communication with the at least one processor, having stored thereon executable instructions that, when executed by the at least one processor, cause the at least one processor to:

display, on the display, a plurality of discussions between users of the collaboration system;

receive, via the at least one user input device, the discussion from the plurality of discussions;

display, on the display, a graphical context activation mechanism associated with a discussion between users of the collaboration system;

receive, via the at least one user input device, a selection input indicating that the graphical context activation mechanism has been selected; and display, based on the selection input, a graphical illustration of information regarding the users participating in the discussion, wherein the graphical illustration of the information regarding the users comprises an organization chart illustrating at least one of the users in an organization hierarchy;

wherein the graphical illustration of the information regarding the users further comprises at least one pin on a geographical map indicating a location of at least one of the users; and wherein selection of the at least one pin causes display of an overlay window displaying information concerning at least one of the users' contact information and contribution to the discussion.

8. The apparatus of claim 7, wherein the executable instructions that, when executed by the at least one processor, cause the at least one processor to display the graphical illustration are further operative to display indicia of identity of at least one of the users.

9. The apparatus of claim 8, wherein the executable instructions that, when executed by the at least one processor, cause the at least one processor to display the indicia of identity are further operative to display visual depictions of at least one of the users.

10. The apparatus of claim 7, wherein the storage device further comprises executable instructions that, when executed by the at least one processor, cause the at least one processor to:

display, on the display, a textual context activation mechanism associated with the discussion;

receive, via the at least one user input device, a selection input indicating that the textual context activation mechanism has been selected; and display, on the display based on the selection input, a text-based context regarding the discussion.

11. The apparatus of claim 7, wherein the text-based context comprises at least a portion of the conversation.

12. An apparatus for use with a collaboration system, comprising:

a display;

at least one user input device;

at least one processor in communication with the display and the at least one user input device; and a storage device, in communication with the at least one processor, having stored thereon executable instructions that, when executed by the at least one processor, cause the at least one processor to:

display, on the display, a graphical context activation mechanism associated with a discussion between users of the collaboration system;

receive, via the at least one user input device, a selection input indicating that the graphical context activation mechanism has been selected;

display, based on the selection input, a graphical illustration of information regarding the users participating in the discussion; and display, on the display, a discussion selection input mechanism, wherein the discussion selection input mechanism comprises indicia regarding at least one discussion, the indicia regarding the at least one discussion further comprising at least one of a plurality of priority levels associated with at least some of the at least one discussion, wherein the graphical illustration of the information regarding the users comprises an organization chart illustrating at least one of the users in an organization hierarchy;

wherein the graphical illustration of the information regarding the users further comprises at least one pin on a geographical map indicating a location of at least one of the users; and wherein selection of the at least one pin causes display of an overlay window displaying information concerning at least one of the users' contact information and contribution to the discussion.

* * * * *